United States Patent [19]
Lipe

[11] 3,746,460
[45] July 17, 1973

[54] ATTACHMENT FOR HAND DRILLS

[76] Inventor: Gordon C. Lipe, West Lake Rd., Skaneateles, N.Y. 13152

[22] Filed: June 10, 1971

[21] Appl. No.: 151,688

[52] U.S. Cl. .............................. 408/112, 408/712
[51] Int. Cl. ................................ B23b 45/14
[58] Field of Search .................... 408/712, 112, 98, 408/95, 96

[56] References Cited
UNITED STATES PATENTS

| | | | |
|---|---|---|---|
| 1,590,643 | 6/1926 | Neuwelt | 408/112 |
| 1,470,143 | 10/1923 | Buterbaugh | 408/112 |
| 2,536,333 | 1/1951 | Waxelbaum | 408/112 |
| 2,831,376 | 4/1958 | Daniels | 408/112 X |
| 3,077,129 | 2/1963 | Carles | 408/112 |
| 3,534,639 | 10/1970 | Treichler | 408/112 |

*Primary Examiner*—Andrew R. Juhasz
*Assistant Examiner*—Z. R. Bilinsky
*Attorney*—Bruns & Jenny

[57] ABSTRACT

A drill attachment capable of holding a portable electric drill so that a drilling operation can be performed perpendicular to an oblique surface of a workpiece. The drill attachment includes a tubular guide member closed at one end which is releasably secured to the body of a drill in parallel relation to the drill bit. To facilitate up and down movement of the drill and tubular member, a plunger is positioned in the tubular member and projects outwardly from the free end thereof. A biasing spring is positioned in the tubular member between its closed end and the inner end of the plunger to further enhance this up and down movement. A base member is provided to engage a portion of the oblique surface of the workpiece during the drilling operation. The free end of the plunger is pivotally connected to the base member to permit the angular adjustment of the base to coincide with the angle of the oblique surface. Once the desired adjusted position is obtained, suitable releasable means are provided to hold the plunger and base member in place.

1 Claim, 8 Drawing Figures

PATENTED JUL 17 1973 3,746,460

INVENTOR.
GORDON C. LIPE
BY
Bruns & Jenney
ATTORNEYS

ATTACHMENT FOR HAND DRILLS

BACKGROUND OF THE INVENTION

This invention relates to a drill attachment which is particularly useful in guiding a drill so that a drilling operation may be performed perpendicular to an irregular or oblique surface of a workpiece, or at any desired angle to the workpiece surface.

Frequently, it is desirable to perform a drilling operation in an oblique or irregular surface. This is a difficult task particularly when the bore must be perpendicular to the oblique surface. Past efforts to accomplish this have necessitated elaborate fixturing to hold the drill and/or workpiece in place during the drilling operation. This is both time consuming and expensive. In addition, such fixturing is generally bulky and difficult to move around. Thus, when it is desirable to drill a hole in a workpiece such as a ski which is relatively inexpensive to start with, the high cost and immobility of this type fixturing has been inhibitive.

SUMMARY OF THE INVENTION

The present invention contemplates a low cost, compact drill attachment which can quickly and easily be mounted on a drill in parallel relation to the drill bit. Its simple construction enables the user to quickly bring the drill into a perpendicular relationship with any oblique surface in which it is desired to perform a drilling operation.

This is accomplished by using a tubular guide member having a closed end and mounting the drill in parallel relationship therewith using a suitable securing means such as a clamp. A plunger is positioned in the tubular member and projects outwardly from the open end thereof. A biasing spring is positioned between the inner end of the plunger and the closed end of the tubular member to facilitate the up and down movement of the drill. A base member engages a portion of the oblique surface during the drilling operation and is pivotally connected to the free end of the plunger to permit the angular adjustment of the base member to coincide with the angle of the oblique surface. Suitable releasable locking means are provided to temporarily secure the plunger and base member in this desired position thereby assuring that the drill bit will be perpendicular to the oblique surface.

The design of the drill attachement is such that it is also useful in performing drilling operations on flat surfaces. Likewise it may be easily coupled to drills of various body shapes with little or no modification thereby increasing its flexibility. Furthermore, with the addition of a stop collar on the plunger, the depth of the drilling operation can be accurately controlled. A scale may also be placed on the plunger to facilitate this function.

Similarly, the free end of the plunger may be adapted to coact with a scale placed on the pivotal connecting means to quickly and easily obtain the desired angular adjustment.

The drill attachment because of its relatively small number of lightweight parts and simplicity of design requires little maintenance, is very economical to manufacture, and is easily portable thereby opening up a wide variety of new applications around the home and in commercial business.

BRIEF DESCRIPTION OF THE DRAWINGS

FIG. 2 is an enlarged, detailed, side elevation of a modified form of the drill attachment shown in FIG. 1, partly in section;

FIG. 6 is a fragmentary rear elevation of the drill attachement of FIG. 2;

FIG. 8 is a fragmentary side elevation of a portion of the drill attachment of FIG. 2 adjusted to an oblique angular position.

DESCRIPTION OF THE PREFERRED EMBODIMENT

Figure 1:
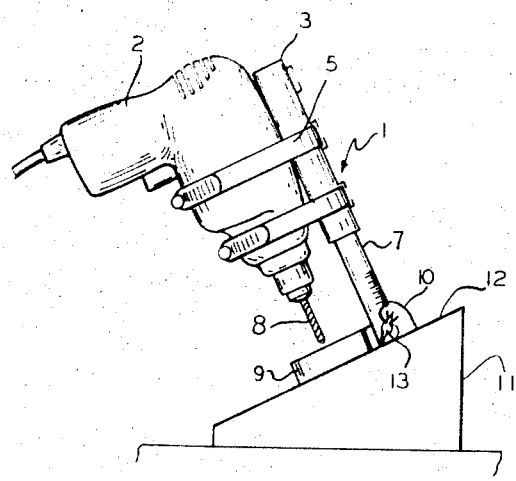
FIG. 1 is a side elevation of a drill attachment embodying the present invention attached to a drill in perpendicular relationship with the oblique surface of a workpiece.

Referring to FIG. 1, there is shown a drill attachment 1 mounted on a portable electric drill 2 for performing a drilling operation in an oblique surface 12 of a workpiece 11. The attachement is held in parallel relation to the drill bit 8 by securing means 5. The drill attachment 1 comprises a tubular guide member 3 having a closed-end, a plunger 7 projecting from the open end of the tubular member, a base member 9, and an angular adjustment means 10 for pivotally connecting the base member to the free end of the plunger. Also included in the drill attachment but not shown in FIG. 1 is a biasing means such as a spring which is positioned between the closed end of the tubular member and the inner end of the plunger.

The angular adjustment means 10 is adjusted to a position coinciding with the angle of the oblique surface 12. A releasable locking means 13 such as a wing screw and nut holds the base member and plunger in the desired position. The bottom of the base member 9 is thus able to engage the oblique surface and maintain the drill bit 8 perpendicular to it. The drill may then be moved in a downward direction following the longitudinal axis of the plunger so that the drill bit engages the oblique surface perpendicular thereto to perform the desired drilling operation. The drill attachment may also be used for workpieces (not shown) having flat or irregular surfaces in which it is desirable to perform a similar drilling operation.

It is of course recognized that the shape of the drill body may vary without deviating from the essence of this invention as long as the drill bit remains parallel to the longtiudinal axis of the plunger. Gnerally, all that is required is a modification of the means used to mount the drill attachement on the drill. Likewise, the securing means, shown in FIG. 1 as a clamp, may also be accomplished by strapping, bolting or welding the drill attachement to the drill.

The drill attachment 1, for ease of illustration and explanation, is shown in greater detail in FIG. 2. The tubular guide member 3 has a closed end 24 and an open end 25, and may by cylindrical or polygonal in cross section. If desired, holding means 4 may be attached to the tubular member to assist in securing the attachment to the drill. The plunger 7 has a cut-away portion 34 at its outer end with a vertical edge 21 in alignment with the center line of the plunger. Also formed in the plunger is a transverse slot 32 best shown in FIG. 5 immediately adjacent the cut-away portion and perpendicular to its vertical edge 21.

A biasing spring 14 is positioned in the tubular member 3 between its closed end 24 and the inner end 15 of the plunger. This allows the tubular guide member to move along the longitudinal axis of the plunger when a downward force is applied thereto and to return to its original position when the force is removed.

Plunger 7 is formed with a longitudinally extending slot 17 which extends from a point just below its inner end 15 to a point adjacent the lower end slot 32 as best shown in FIG. 2. A thumb screw 16 passes through a tapped hole in the lower end of the tubular guide member 3 and extends partially into slot 17 to prevent any rotation of the plunger relative to the guide member. The thumb screw and the upper end of slot 17 also coact to prevent the plunger from coming all of the way out of the plunger although, if necessary, the parts can be easily disassembled by backing off on the thumb screw until it no longer projects into the slot. If desired, the plunger can also be held in a retracted position in the guide member, against the bias of spring 14, by tightening the thumb screw into frictional engagement with the bottom of slot 17.

The plunger 7 may, if desired, by provided with a scale 20 which allows the drill user to visually determine the depth of the drill bit in the workpiece. The depth control can be made fail safe by placing a stop collar 18 at the mark on the scale necessary to obtain the desired depth and securing it there as by a thumb screw 19. Thus, when the drill is moved downward, the tubular guide member will move along the plunger and stop when it hits the stop collar.

Figure 5:
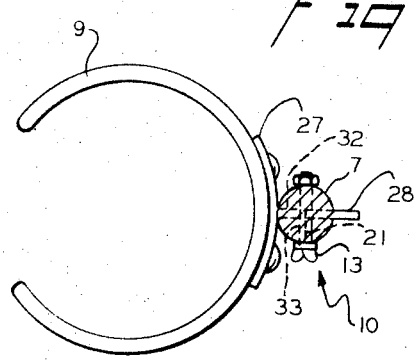
FIG. 5 is a sectional view taken on line 5—5 of FIG. 2.
Figure 7:
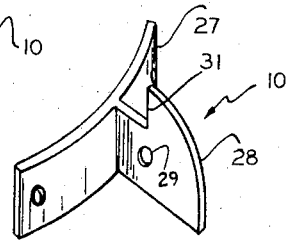
FIG. 7 is an enlarged isometric view of a portion of the base member connecting bracket.

The angular adjustment means 10 is shown in detail in FIG. 7 and comprises a connecting bracket 27 secured to the base member 9 by means such as rivets or a weld, and a plate portion 28 having a vertical edge 31 which is pivotally connected to the free end of the plunger. The pivot plate portion 28 has a vertical edge 31 and a thickness smaller than that of the transverse slot 32, thus allowing for the free movement of the plate 28 within the slot 32. A pivot hole 29 is formed directly below the vertical edge 31 in the pivot plate portion, and a corresponding pivot hole 33, best shown in FIGS. 5 and 6, is formed in the free end of the plunger through its center line directly below the vertical edge 21. With this construction, when the holes 29 and 33 are aligned, the vertical edges 21 and 31 also line up with each other.

The plate portion 28 and plunger are held in place by the releasable locking means 13 and the alignment of edges 21 and 31 produces a 90° angle between the plunger 7 and the base member 9 as shown in FIG. 2. When an angular adjustment other than 90° is required, the releasable locking means 13 is loosened and the pivot plate portion moved in the transverse slot until the desired angle is obtained. This is best shown in FIG. 8. Note that a scale 23 may also be placed on the side of the pivot plate portion to indicate the distance the plate must be moved to obtain frequently used angles such as 30°, 45°, 60° or the like. This is accomplished by lining up the desired scale mark 23 with the vertical edge 21 of the plunger to obtain the desired angle.

The base member 9 is best shown in FIG. 5. Although it is shown as having a semi-circular shape, the base member may also be square shaped, U-shaped or the like as long as it is capable of engaging the surface of the workpiece in which the drilling operation is to be performed and has an open center to give the drill bit access to the workpiece. Moreover, it is desirable that the base member act to stabilize the drill during the drilling operation by supplying a steady support.

The releasable locking means 13 generally comprises a pivot pin such as a wing screw which extends through pivot holes 33 and 29, and a nut on the end of the screw whereby tightening the nut causes the plate portion 28 to be clamped between the inner walls of the transverse slot. This is best shown in FIGS. 5 and 6.

Figure 3:
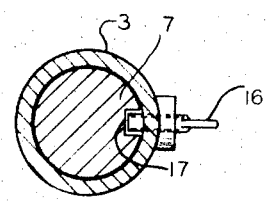
FIG. 3 is a sectional view on the line 3—3 of FIG. 2.
Figure 4:
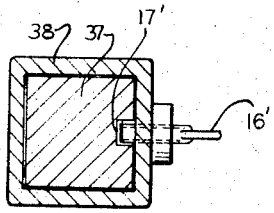
FIG. 4 is a sectional view, corresponding to FIG. 3, of a modified form of drill attachment.

FIG. 4 shows a modified form of plunger and tubular guide. Here both the plunger 37 and tubular guide member 38 have the same features as plunger 7 and tubular guide member 3 shown in FIGS. 2 and 3 except that they are square in cross section. It will be recognized that the longitudinal guide slot 17' and thumb screw 16' shown in FIG. 4 can be eliminated, if desired, because the square-shaped plunger and tubular member are not subject to rotational twisting during the drilling operation.

The drill attachment's simple design allows the various elements to be made of a variety of low cost materials such as aluminum, plastics or the like without compromising its accuracy or quality.

I claim:

1. A drill attachment for guiding a drill having a drill bit while performing a drilling operation in a workpiece comprising: a tubular guide member having a closed and an open end; means to secure the guide member to the body of the drill in parallel relation to the drill bit; a plunger positioned in the tubular member and projecting outwardly from the open end thereof; the plunger being formed with a longitudinal guide slot, the tubular guide member being provided with a hole adjacent its open end, and a thumb screw extending through the hole and into the longitudinal guide slot for preventing relative rotation between the plunger and guide member; a biasing spring positioned in the tubular member between its closed end and the inner end of the plunger; a base member engageable with the surface of the workpiece during the drillling operation, the central portion of the member being open to permit the drill bit to pass therethrough; interengaging means on the base member and at the outer end of the plunger for pivotally connecting the base member and plunger together, the interengaging means permitting the position of the base to be angularly adjusted with respect to the plunger; and releasable locking means coacting with the interengaging means to hold the base member in the desired position of adjustment.

* * * * *